US012526766B2

(12) United States Patent
Ting et al.

(10) Patent No.: US 12,526,766 B2
(45) Date of Patent: Jan. 13, 2026

(54) AUTOMATED DETERMINATION OF ACCESS-POINT GEOGRAPHIC LOCATIONS

(71) Applicant: ARRIS Enterprises LLC, Suwanee, GA (US)

(72) Inventors: See Ho Ting, Singapore (SG); Cheng-Ming Chien, Taipei (TW); Kuan-Chih Chou, Taipei (TW); Lin Zeng, Sunnyvale, CA (US); Chih-Ming Lam, Singapore (SG); Wei Xiang Ng, Singapore (SG); Arsalan Habib, Sunnyvale, CA (US); Anand Krishnamachari, Campbell, CA (US)

(73) Assignee: Ruckus IP Holdings LLC, Claremont, NC (US)

( * ) Notice: Subject to any disclaimer, the term of this patent is extended or adjusted under 35 U.S.C. 154(b) by 302 days.

(21) Appl. No.: 18/469,622

(22) Filed: Sep. 19, 2023

(65) Prior Publication Data

US 2024/0107495 A1    Mar. 28, 2024

Related U.S. Application Data

(60) Provisional application No. 63/407,864, filed on Sep. 19, 2022.

(51) Int. Cl.
*H04W 64/00* (2009.01)

(52) U.S. Cl.
CPC ................. *H04W 64/003* (2013.01)

(58) Field of Classification Search
CPC .................................................. H04W 64/003
See application file for complete search history.

(56) References Cited

U.S. PATENT DOCUMENTS

| | | | |
|---|---|---|---|
| 2015/0126215 A1* | 5/2015 | Pandey | G01S 5/021 455/456.1 |
| 2016/0029178 A1* | 1/2016 | Schatzberg | H04W 64/003 455/456.1 |
| 2024/0040537 A1* | 2/2024 | El Ferkouss | H04W 64/003 |

* cited by examiner

*Primary Examiner* — Justin Y Lee
(74) *Attorney, Agent, or Firm* — Steven Stupp

(57) ABSTRACT

During operation, a computer system may provide instructions to access points in an indoor environment to measure relative distances between the access points. Then, the computer system may receive the measured relative distances. Moreover, the computer system may calculate geographic locations of the access points based at least in part on the measured relative distances. Next, the computer system may select potential anchor access points in the access points, and may provide, to an electronic device, information specifying the potential anchor access points. Furthermore, the computer system may receive, from the electronic device, second information specifying anchor access points in the potential access points and defined locations of the anchor access points. Additionally, the computer system may update the geographic locations based at least in part on the defined of the anchor access points, and may provide, to the access points, the updated geographic locations.

20 Claims, 4 Drawing Sheets

AUTOMATED DETERMINATION OF ACCESS-POINT GEOGRAPHIC LOCATIONS

CROSS REFERENCE TO RELATED APPLICATIONS

This application claims priority under 35 U.S.C. 119(e) to U.S. Provisional Application Ser. No. 63/407,864, "Automated Determination of Access-Point Geographic Locations," filed on Sep. 19, 2022, by See Ho Ting, et al. the contents of which are herein incorporated by reference.

FIELD

The described embodiments relate to techniques for determining access-point geographic locations in an indoor environment.

BACKGROUND

Many electronic devices are capable of wirelessly communicating with other electronic devices. Notably, these electronic devices can include a networking subsystem that implements a network interface for: a cellular network (UMTS, LTE, 5G Core or 5GC, etc.), a wireless local area network (e.g., a wireless network such as described in the Institute of Electrical and Electronics Engineers (IEEE) 802.11 standard or Bluetooth™ from the Bluetooth Special Interest Group of Kirkland, Washington), and/or another type of wireless network. For example, many electronic devices communicate with each other via wireless local area networks (WLANs) using an IEEE 802.11-compatible communication protocol (which is sometimes collectively referred to as 'Wi-Fi'). In a typical deployment, a Wi-Fi-based WLAN includes one or more access points or APs (which are sometimes referred to as basic service sets or BSSs) that communicate wirelessly with each other and with other electronic devices using Wi-Fi, and that provide access to another network (such as the Internet) via IEEE 802.3 (which is sometimes referred to as 'Ethernet').

Recently, Wi-Fi has been allowed to use the unlicensed 6 GHz band of frequencies. When operating indoors using the 6 GHz band of frequencies, electronic devices (such as access points) are allowed to operate in different modes. For example, in a low-power mode, access points are allowed to use the 6 GHz band of frequencies while indoors, but their transmit power is constrained to be less than 5 dBm/MHz in the US and less than 10 dBm/MHz in Europe to reduce interference with other electronic devices. Alternatively, a standard power mode allows access points to use higher transmit power or directional antennas.

In order to prevent interference with other wireless networks (such as incumbent microwave networks operated by cellular-telephone network providers), operation in the 6 GHz band of frequencies by access points using standard power mode or with directional antennas is coordinated by a spectrum management system, which is referred to as an Automated Frequency Coordination (AFC) system. Notably, an AFC system takes into account fixed microwave links in proximity to (or wireless range of) an access point and only authorizes carrier frequencies and transmit power levels for unlicensed users of the 6 GHz band of frequencies that will not create harmful interference.

However, in order coordinate operation in the 6 GHz band of frequencies, the AFC system needs the geographic location of the access point. It is often difficult to determine the geographic location when the access point is indoors.

SUMMARY

A computer system that calculates geographic locations of access points in an environment is described. This computer system includes an interface circuit that communicates with the access points (and, more generally, radio nodes, computer network devices, etc.) and an electronic device. During operation, the computer system provides, addressed to the access points, instructions to measure relative distances between the access points. Then, the computer system receives, associated with the access points, the measured relative distances. Moreover, the computer system calculates the geographic locations of the access points based at least in part on the measured relative distances. Next, the computer system selects potential anchor access points in the access points, and provides, addressed to the electronic device, information specifying the potential anchor access points. Furthermore, the computer system receives, associated with the electronic device, second information specifying anchor access points in the potential access points and defined locations of the anchor access points, where the defined locations of the anchor access points include Global Positioning System (GPS) locations. Additionally, the computer system updates the geographic locations based at least in part on the defined locations of the anchor access points, and provides, addressed to the access points, the updated geographic locations.

Note that the environment may be an indoor environment.

Moreover, the relative distances may be between pairs of access points in the access points.

Furthermore, the measurements may be performed using an IEEE 802.11mc protocol. More generally, the measurements may be based at least in part on time-of-flight measurements. Alternatively or additionally, in some embodiments the measurements may include one or more communication performance metrics, such as: received signal strength indication (RSSI), signal-to-noise ratio (SNR), etc.

Additionally, the potential anchor access points may be selected based at least in part on: proximity to a boundary of the environment; being within wireless range of a number of access points (such as the largest number of access points); being able to receive cellular-telephone signals and/or GPS signals; uncertainties of the geographic locations; and/or being an access point in the access points that is unable to receive wireless signals from any other of the access points.

In some embodiments, the anchor access points may be selected based at least in part on: proximity to a boundary of the environment; being within wireless range of a number of access points (such as the largest number of access points); being able to receive cellular-telephone signals and/or GPS signals; and/or include an instance of a GPS integrated circuit.

Moreover, the updated geographic locations may have a reduced uncertainty than the geographic locations.

Furthermore, the computer system may include: a controller of the access points, which manages and/or configures operation of the access points. Alternatively, or additionally, the computer system may include a cloud-based computer system. This cloud-based computer system may communicate with the access points using wired communication.

Additionally, the defined locations may include heights where the access points are located. The heights may be provided by a user of the electronic device.

In some embodiments, the calculating of the geographic locations may include computing a connected graph associated with the access points.

Note that the calculating of the geographic locations may be based at least in part on triangulation or trilateration.

Moreover, the computer system may receive configuration information that enables use by the access points of a standard power mode in a band of frequencies in a shared frequency spectrum, where the standard power mode is associated with coordinated use of the band of frequencies by an AFC system.

Furthermore, communication between the computer system and the access points may occur via the controller.

Additionally, the calculating of the geographic locations may include: estimating a distance matrix using a shortest path technique, where the shortest path technique provides missing elements in the distance matrix; and principal component analysis and/or multidimensional scaling of the distance matrix.

In some embodiments, the updated geographic locations include longitudes and latitudes of the access points.

Note that at least some of the access points may exclude instances of the GPS integrated circuit.

Another embodiment provides one of the access points (such as an access point), which performs counterpart operations to at least some of the aforementioned operations in one or more of the preceding embodiments.

Another embodiment provides the electronic device, which performs counterpart operations to at least some of the aforementioned operations in one or more of the preceding embodiments. Alternatively, another embodiment provides an application that executes in an environment of the electronic device (such as an operating system), which performs counterpart operations to at least some of the aforementioned operations in one or more of the preceding embodiments.

Another embodiment provides a computer-readable storage medium with program instructions for use with the computer system, the access point or the electronic device. When executed by the computer system, the access point or the electronic device, the program instructions cause the computer system, the access point or the electronic device to perform at least some of the aforementioned operations or counterparts to at least some of the aforementioned operations in one or more of the preceding embodiments.

Another embodiment provides a method, which may be performed by the computer system, the access point or the electronic device. This method includes at least some of the aforementioned operations or counterparts to at least some of the aforementioned operations in one or more of the preceding embodiments.

This Summary is provided for purposes of illustrating some exemplary embodiments to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Figure 1:
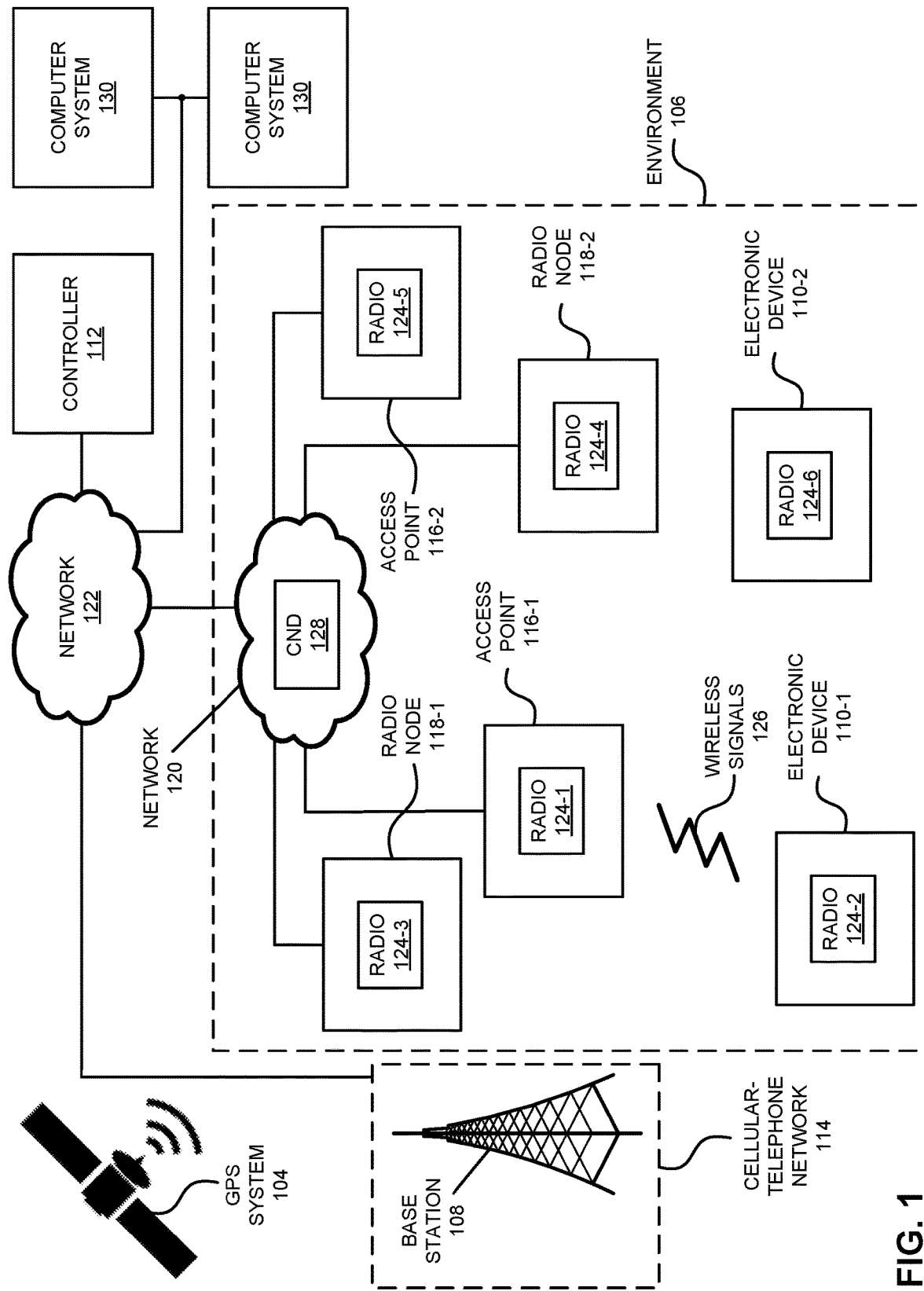
FIG. 1 is a block diagram illustrating an example of communication among electronic devices in accordance with an embodiment of the present disclosure.

During operation, a computer system may provide, addressed to access points in an environment (such as an indoor environment), instructions to measure relative distances between the access points. Then, the computer system may receive, associated with the access points, the measured relative distances. Moreover, the computer system may calculate geographic locations of the access points based at least in part on the measured relative distances. Next, the computer system may select potential anchor access points in the access points, and may provide, addressed to the electronic device, information specifying the potential anchor access points. Furthermore, the computer system may receive, associated with the electronic device, second information specifying anchor access points in the potential access points and defined locations of the anchor access points, where the defined locations of the anchor access points include GPS locations. Additionally, the computer system may update the geographic locations based at least in part on the defined locations of the anchor access points, and may provide, addressed to the access points, the updated geographic locations.

By calculating the updated geographic locations, these communication techniques may allow the geographic locations of the access points in the environment to be determined. For example, the calculated updated geographic locations may have uncertainties less than a predefined amount (such as less than or equal to 5%). Moreover, the communication techniques may be used with a wide variety of network topologies (such as a grid or a hexagonal topology), including a dynamic topology. These capabilities may allow the access points to operate in a standard power mode in a band of frequencies in a shared-license band of frequencies, such as a 6 GHz band of frequencies. Notably, the access points may be able to provide the updated geographic locations to an AFC system that coordinates use of the 6 GHz band of frequencies. In turn, the ability to use the 6 GHz band of frequencies may improve the communication performance of the access points. Consequently, the communication techniques may improve the user experience when using the access points and/or an electronic device associated with at least one of the access points.

In the discussion that follows, electronic devices or components in a system communicate packets in accordance with a wireless communication protocol, such as: a wireless communication protocol that is compatible with an IEEE 802.11 standard (which is sometimes referred to as 'Wi-Fi®,' from the Wi-Fi Alliance of Austin, Texas), Bluetooth or Bluetooth low energy (BLE), an IEEE 802.15.4 standard (which is sometimes referred to as Zigbee), a low-power wide-area network (LoRaWAN), a cellular-telephone network or data network communication protocol (such as a third generation or 3G communication protocol, a fourth generation or 4G communication protocol, e.g., Long Term Evolution or LTE or 5GC (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node, a base station or a switch in the wireless network and/or the cellular-telephone network may communicate with a local or remotely located computer (such as a controller) using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi and Ethernet are used as illustrative examples.

We now describe some embodiments of the communication techniques. FIG. 1 presents a block diagram illustrating an example of communication in an environment 106 (such as an indoor environment, e.g., in a building) with one or more electronic devices 110 (such as cellular telephones, portable electronic devices, stations or clients, another type of electronic device, etc.) via a macrocell in a cellular-telephone network 114 (which may include a base station 108), one or more access points 116 (which may communicate using Wi-Fi) in a WLAN and/or one or more radio nodes 118 (which may communicate using LTE or another cellular-telephone data communication protocol) in another cellular-telephone network (such as a small-scale network or a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'computer network device.' Moreover, one or more base stations (such as base station 108), access points 116, and/or radio nodes 118 may be included in one or more wireless networks, such as: a WLAN and/or a cellular-telephone network. In some embodiments, access points 116 may include a physical access point and/or a virtual access point that is implemented in software in an environment of an electronic device or a computer.

Note that access points 116 and/or radio nodes 118 may communicate with each other and/or controller 112 (which may be a local or a cloud-based controller that manages and/or configures access points 116, radio nodes 118 and/or a computer network device (CND) 128, or that provides cloud-based storage and/or analytical services) using a wired communication protocol (such as Ethernet) via network 120 and/or 122. Alternatively, or additionally, access points 116 and/or radio nodes 118 may communicate with computer system 130 (which may include one or more computers at one or more locations) using the wired communication protocol. However, in some embodiments, access points 116 and/or radio nodes 118 may communicate with each other, controller 112 and/or computer system 130 using wireless communication (e.g., one of access points 116 may be a mesh access point in a mesh network). Note that networks 120 and 122 may be the same or different networks. For example, networks 120 and/or 122 may an LAN, an intra-net or the Internet. In some embodiments, network 120 may include one or more routers and/or switches (such as computer network device 128).

Figure 4:
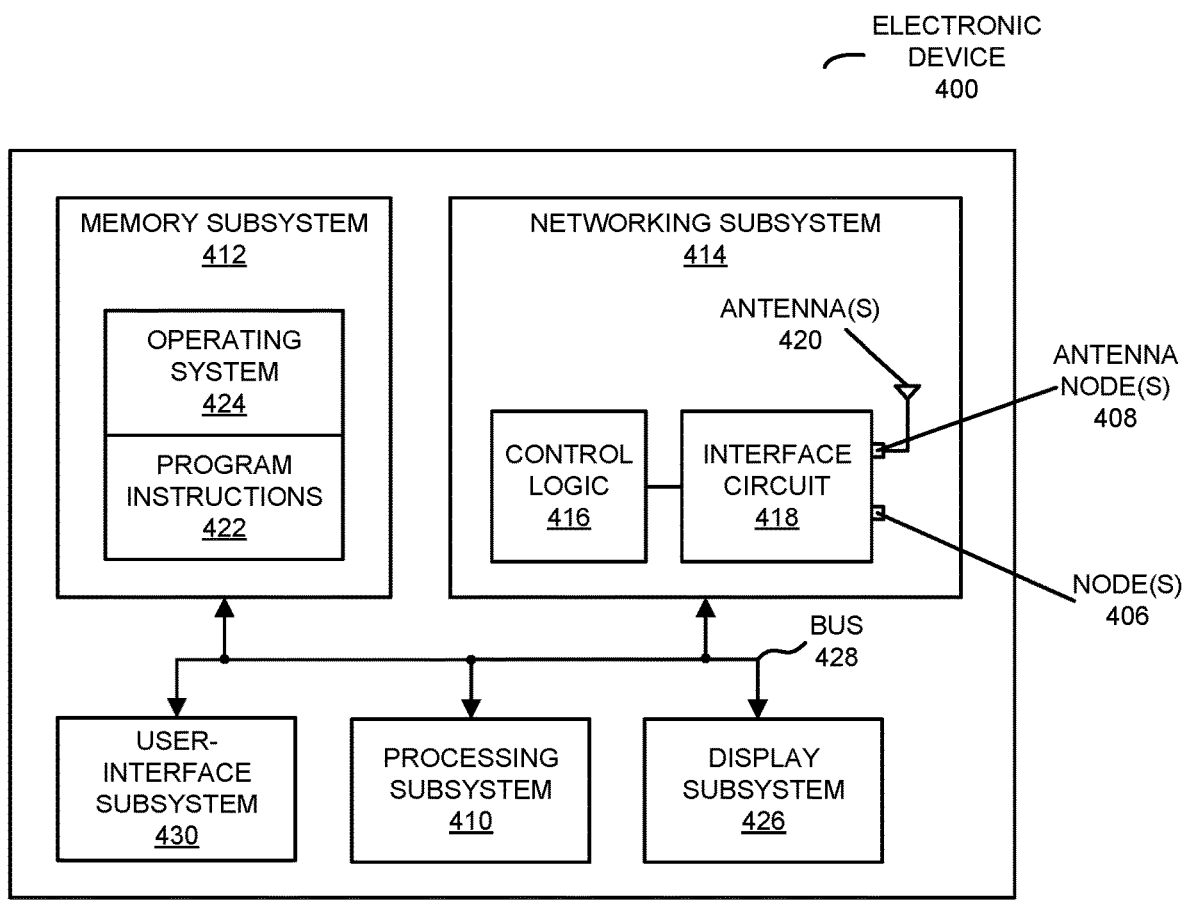
FIG. 4 is a block diagram illustrating an example of communication among electronic devices in accordance with an embodiment of the present disclosure.

As described further below with reference to FIG. 4, electronic devices 110, controller 112, access points 116, radio nodes 118, computer network device 128, and/or computer system 130 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, access points 116 and/or radio nodes 118 and electronic devices 110 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-squared error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as, but not limited to: 900 MHz, 2.4 GHz, 5 GHz, 6 GHz, 7 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA) and/or multiple input, multiple output (MIMO) communication.

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed previously, in can be difficult to determine the geographic locations of electronic devices when the electronic devices are indoors or in an indoor environment. For computer network devices (such as access points 116), this difficulty may preclude the use of a 6 GHz band of frequencies, because access points 116 may not have the information needed by an AFC system 132 that coordinates use of the 6 GHz band of frequencies. Alternatively, access points 116 may need to include a GPS integrated circuit that determines the geographic locations of access points 116 using communication with a GPS, but which increase the cost and complexity of access points 116.

Figure 2:
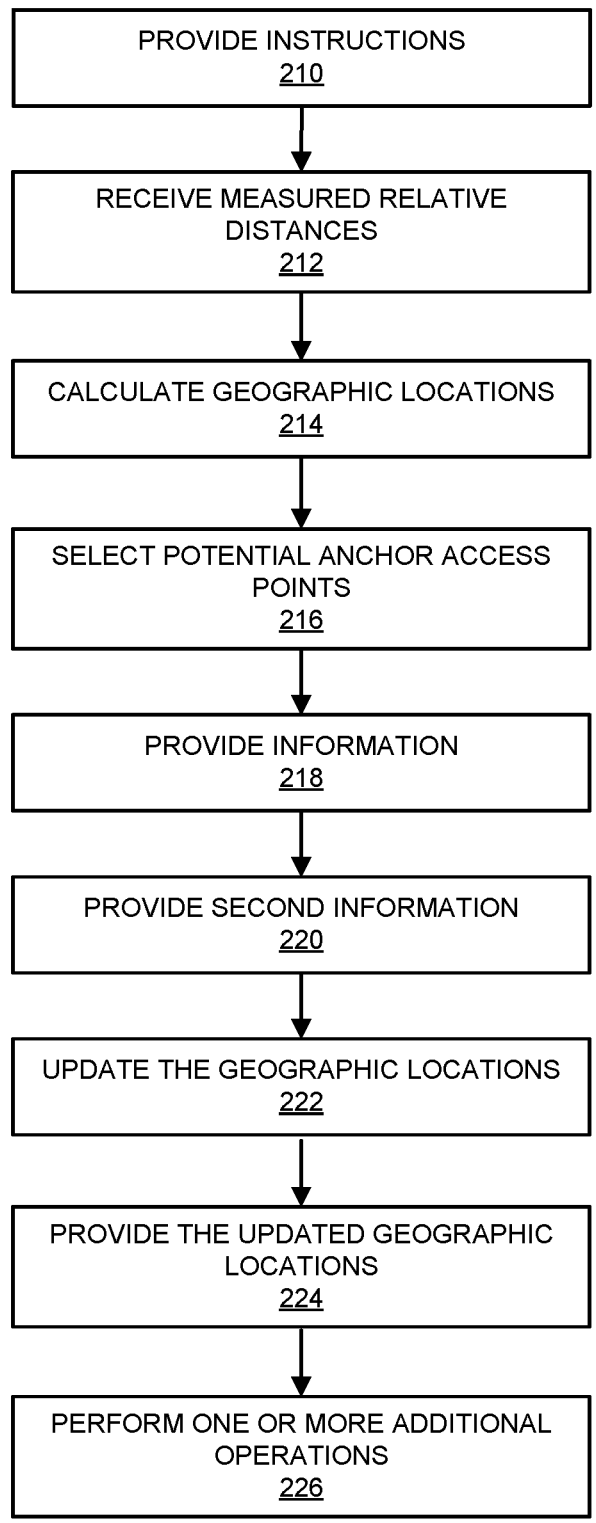
FIG. 2 is a flow diagram illustrating an example of a method for calculating geographic locations of access points in FIG. 1 in accordance with an embodiment of the present disclosure.

Moreover, as described further below with reference to FIGS. 2-4, the disclosed communication techniques may be used to address these problems. In the communication techniques, computer system 130 may calculate geographic locations of access points 116 in environment 106 (such as an indoor environment) using measurements performed by access points 116. Notably, computer system 130 may optionally receive configuration information (e.g., from a network operator) that enables use by access points 116 of a standard power mode in a band of frequencies in a shared frequency spectrum, where the standard power mode is associated with coordinated use of the band of frequencies by AFC system 132.

Then, computer system 130 may provide, to access points 116 (e.g., via controller 112), instructions to measure relative distances between access points 116. For example, the relative distances may be between pairs of access points in access points 116, such as access points 116-1 and 116-2. Furthermore, the measurements may be performed using an IEEE 802.11mc protocol. More generally, the measurements may be based at least in part on time-of-flight measurements, such as fine time measurements (FTM) or round-trip time measurements (RTT).

Alternatively or additionally, in some embodiments the measurements may include one or more communication performance metrics, such as: RSSI, SNR, etc. Thus, in some embodiments, for a given access point (such as access point 116-1) the one or more communication performance metrics may include: an RSSI of −75 dBm for wireless signals received from a first access point; an RSSI of −70 dBm for wireless signals received from a second access point; and an RSSI of −65 dBm for wireless signals received from a third access point. Then, the relative distance d between a pair of access points may be calculated using $$d = \alpha \cdot 10^{\frac{P-RSSI}{10n}},$$

where $\alpha$ is a multiplication normalization factor, P is the transmission power and n is a wave propagation loss factor (typically, a value between 2 and 4). For example, a may be 0.1, P may be 0 (minimum power), and n may be 2.7.

Computer system 130 may receive, from access points 116 (e.g., via controller 112), the measured relative distances. Moreover, computer system 130 may calculate the geographic locations of access points 116 based at least in part on the measured relative distances. For example, the calculating of the geographic locations may be based at least in part on triangulation or trilateration. Moreover, the calculating of the geographic locations may include: estimating a distance matrix using a shortest path technique, where the shortest path technique provides missing elements in the distance matrix; and principal component analysis (which is sometimes referred to as 'singular value decomposition') of the distance matrix. Alternatively or additionally, the calculating of the geographic locations may include multidimensional scaling of the distance matrix (and, more generally, a nonlinear dimensional reduction technique). In some embodiments, the calculating of the geographic locations may include computing a connected graph associated with the access points.

Next, computer system 130 may select potential anchor access points in access points 116. For example, the potential anchor access points may be selected based at least in part on: proximity to a boundary of environment 106 (such as an access point near a window or a wall of a building that is able to receive cellular-telephone signals from cellular-telephone network 114 and/or GPS signals from GPS system 104); being within wireless range of a number of access points (such as an access point that is within wireless range of the largest number of access points or a number of access points greater than a predefined value, e.g., three or five); being able to receive the cellular-telephone signals and/or the GPS signals; uncertainties of the geographic locations (such as an access point for which the calculated geographic location has the smallest uncertainty or an uncertainty less than a second predefined value, such as 5 or 10%); include an instance of a GPS integrated circuit (which may determine GPS location using cellular-telephone signals and/or GPS signals); and/or being an access point in the access points that is unable to receive wireless signals from any other of access points 116 (which is sometimes referred to as a 'standalone access point'). Note that some or all of access points 116 may exclude instances of the GPS integrated circuit.

Moreover, computer system 130 may provide, to electronic device 110-1, information specifying the potential anchor access points. This information may include identifiers of the potential anchor access points, such as media access control (MAC) addresses. Then, a user of electronic device 110-1 (such as a network operator or an installer of access points 116) may review the potential anchor access points and may select anchor access points in the potential access points (e.g., the user may select the anchor access points in a list of identifiers of the potential access points), which may be a subset of the potential access points. For example, the anchor access points may be selected based at least in part on: proximity to a boundary of environment 106; being within wireless range of a number of access points (such as the largest number of access points or a number of access points exceeding the predefined value); being able to receive cellular-telephone signals and/or GPS signals; and/or include an instance of a GPS integrated circuit. In some embodiments, the user may select 3-5 anchor access points.

The user may also use electronic device 110-1 to determine defined locations of the anchor access points. Notably, electronic device 110-1 may communicate with cellular-telephone network 114 or GPS system 104 to determine the defined locations. Note that the defined locations of the anchor access points may include GPS locations (such as latitudes and longitudes of the anchor access points). For example, an application executing on electronic device 110-1 may make 100 geolocation calls to GPS system 104 to determine the defined location of a given access point (such as access point 116-1). In some embodiments, the user may provide a distance between electronic device 110-1 and a given one of anchor access points, which may be used when determining the defined location of the given anchor access point. Alternatively or additionally, the user may provide heights where the anchor access points are located to electronic device 110-1 (such as via a user interface that the user uses to enter the heights).

Consequently, the defined locations may include three-dimensional (3D) locations of the anchor access points. Next, electronic device 110-1 may provide second information specifying the anchor access points and the defined locations of the anchor access points, which may be received by computer system 130.

Additionally, computer system 130 may update the geographic locations based at least in part on the defined locations of the anchor access points. For example, the defined locations may specify or anchor the connected graph that describes the positions of access points 116. In some embodiments, the known (defined locations) of the anchor access points may be used in conjunction with the relative distances between access points 116 to calculate the updated geographic locations. In this way, the uncertainties of the geographic locations of a remainder of access points 116 (i.e., access points other than the anchor access points) may be reduced relative to the original calculated geographic locations, e.g., to uncertainties of less than or equal to 5%. (The resulting geographic locations are sometimes referred to as updated geographic locations.) Then, computer system 130 may provide, to access points 116 (e.g., via controller 112), the updated geographic locations (which may include latitudes, longitudes and/or heights where access points 116 are located).

Subsequently, when one of access points 116 (such as access points 116-1) wants to use a 6 GHz band of frequencies with standard power mode or a directional antenna in environment 106 (and, more generally, a shared-license band of frequencies that requires coordination by a spectrum allocation server, such as AFC system 132), access point 116-1 may request spectrum allocation from AFC system 132, and this request may include the updated geographic location of access point 116-1. In response, AFC system 132 may provide a list of carrier frequencies or channels and transmit power (such as the equivalent isotropic radiated power or EIRP) that access point 116-1 is allowed to use.

In some embodiments, computer system 130 may repeat the communication techniques periodically (e.g., every 24 hrs.) or as-needed. For example, when one or more of access points 116 has been oved or rebooted, computer system 130 may have the affected access points and their neighboring access points repeat measurements of the relative distances.

In these ways, the communication techniques may allow the geographic locations of access points 116 to be determined with small enough uncertainties in indoor environments so access points 116 have the information needed to request spectrum allocations in a 6 GHz band of frequencies when using a standard power mode or a directional antenna. These capabilities may allow access points 116 to use the 6 GHz band of frequencies and to provide improved communication performance to clients or stations that are associated with or have connections with access points 116 (such as electronic devices 110). Consequently, the communication techniques may improve the user experience when using access points 116 and/or an electronic device (such as electronic device 110-1) that is associated with an access point (such as access point 116-1).

Note that, while FIG. 1 illustrates controller 112 and computer system 130 as separate components, in other embodiments these components may be combined into a single component. Thus, in some embodiments, computer system 130 may be a controller.

While the preceding discussion illustrated the use of measurements based at least in part on IEEE 802.11mc or, more generally, time-of-flight, in other embodiments the relative distances between access points 116 may be measured using one or more communication performance metrics, such as RSSI, SNR, etc. Moreover, while the preceding discussion illustrated some operations being performed by a user of an electronic device (such as electronic device 110-1), in other embodiments the communication techniques may be fully automated. For example, computer system 130 may select the anchor access points instead of the user of electronic device 110-1 and may automate the communication with electronic device 110-1 to obtain the defined locations of the anchor access points.

Furthermore, while the preceding discussion illustrated computer system 130 communicating with access points 116 via controller 112, in other embodiments computer system 130 may communicate with access points 116 without using controller 112. Additionally, while the preceding discussion illustrated measurements of relative distances between access points 116 performed by access points 116, in other embodiments the measurements of relative distances may include measurements between one or more of electronic devices 110 and access points 116. In some embodiments, the communication techniques may be used to determine the height where access points 116 are located, such as heights in a multi-floor building. Thus, in some embodiments, the communication techniques may automatically determine the 3D geographic locations of access points 116 on a floor or on different floors in a building.

We now describe embodiments of the method. FIG. 2 presents a flow diagram illustrating an example of a method 200 for calculating geographic locations of access points in an environment (e.g., an indoor environment), such as access points 116 in FIG. 1 and, more generally, computer-network devices. This method may be performed by a computer system, such as controller 112 or computer system 130 in FIG. 1.

During operation, the computer system may provide, addressed to the access points, instructions (operation 210) to measure relative distances between the access points. For example, the relative distances may be between pairs of access points in the access points. Moreover, the measurements may be performed using an IEEE 802.11mc protocol. More generally, the measurements may be based at least in part on time-of-flight measurements. Alternatively or additionally, in some embodiments the measurements may include one or more communication performance metrics, such as: RSSI, SNR, etc. Then, the computer system may receive, associated with the access points, the measured relative distances (operation 212).

Moreover, the computer system may calculate the geographic locations (operation 214) of the access points based at least in part on the measured relative distances. For example, calculating of the geographic locations may be based at least in part on triangulation or trilateration. Furthermore, the calculating of the geographic locations may include: estimating a distance matrix using a shortest path technique, where the shortest path technique provides missing elements in the distance matrix; and principal component analysis and/or multidimensional scaling of the distance matrix. In some embodiments, the calculating of the geographic locations may include computing a connected graph associated with the access points.

Next, the computer system may select potential anchor access points (operation 216) in the access points. For example, the potential anchor access points may be selected based at least in part on: proximity to a boundary of the environment; being within wireless range of a number of access points (such as the largest number of access points); being able to receive cellular-telephone signals and/or GPS signals; uncertainties of the geographic locations; and/or being an access point in the access points that is unable to receive wireless signals from any other of the access points.

The computer system may provide, addressed to the electronic device, information (operation 218) specifying the potential anchor access points. Furthermore, the computer system may receive, associated with the electronic device, second information (operation 220) specifying anchor access points in the potential access points and defined locations of the anchor access points, where the defined locations of the anchor access points include GPS locations. Note that the anchor access points may be selected based at least in part on: proximity to a boundary of the environment; being within wireless range of a number of access points (such as the largest number of access points); being able to receive cellular-telephone signals and/or GPS signals; and/or include an instance of a GPS integrated circuit. In some embodiments, the defined locations may include heights where the access points are located. The heights may be provided by a user of the electronic device.

Additionally, the computer system may update the geographic locations (operation 222) based at least in part on the defined locations of the anchor access points, and may provide, addressed to the access points, the updated geographic locations (operation 224). Note that the updated geographic locations may have a reduced uncertainty than the geographic locations. In some embodiments, the updated geographic locations may include longitudes and latitudes of the access points.

In some embodiments, the computer system may optionally perform one or more additional operations (operation 226). For example, prior to providing the instructions (operation 210), the computer system may receive configuration information that enables use by the access points of a standard power mode in a band of frequencies in a shared frequency spectrum, where the standard power mode is associated with coordinated use of the band of frequencies by an AFC system.

Note that at least some of the access points may exclude instances of the GPS integrated circuit.

In some embodiments of method 200, there may be additional or fewer operations. Furthermore, the order of the operations may be changed, and/or two or more operations may be combined into a single operation.

Figure 3:
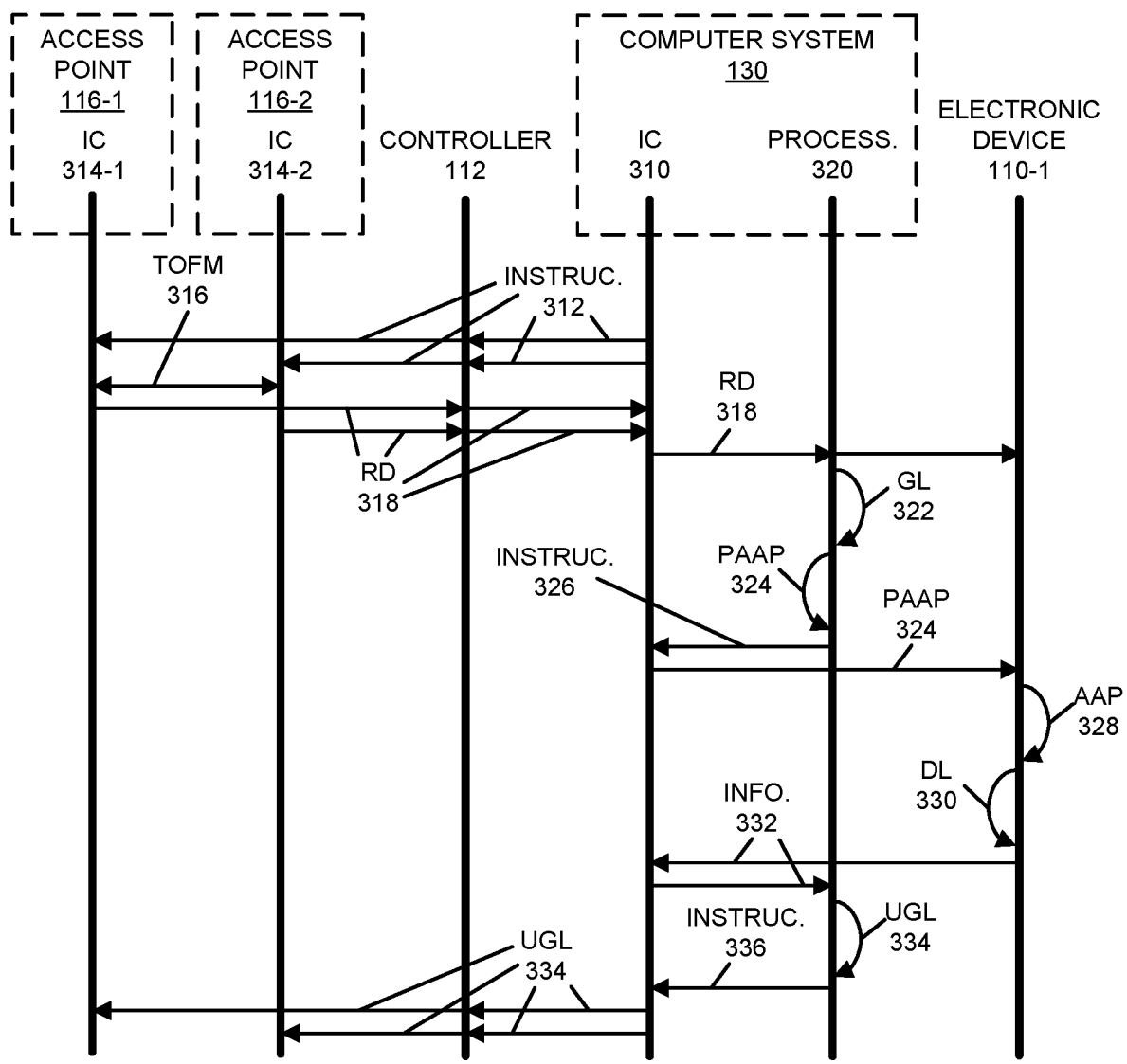
FIG. 3 is a drawing illustrating an example of communication between access points, a controller and a computer system in FIG. 1 in accordance with an embodiment of the present disclosure.

Embodiments of the communication techniques are further illustrated in FIG. 3, which presents a drawing illustrating an example of communication between access points 116, controller 112 and computer system 130. In FIG. 3, an interface circuit 310 in computer system 130 may provide instructions 312 to access points 116 (e.g., via controller 112) to measure relative distances between access points 116. After receiving instructions 312, interface circuits 314 in access points 116 may perform time-of-flight measurements (TOFM) 316 with each other, and may provide measured relative distances (RD) 318 to computer system 130 (e.g., via controller 112).

Moreover, after receiving relative distances 318, interface circuit 310 may provide relative distances 318 to processor 320 in computer system 130. Processor 320 may calculate geographic locations (GL) 322 of access points 116 based at least in part on relative distances 318. Then, processor 320 may select potential anchor access points (PAAP) 324 in access points 116 based at least in part on one or more criteria. Next, processor 320 may instruct 326 interface circuit 310 to provide information specifying potential anchor access points 324 to electronic device 110-1.

After receiving potential anchor access points 324, electronic device 110-1 may present potential anchor access points 324 to a user of electronic device 110-1. For example, electronic device 110-1 may display potential anchor access points 324 in a user interface on a display in electronic device 110-1. The user may then select anchor access points (AAP) 328 in potential anchor access points 326 based on one or more second criteria, such as via a user interface and/or a human-interface device (e.g., a mouse, a keyboard, a touchpad, a touch-sensitive display, a voice-recognition interface, etc.). Moreover, electronic device 110-1 may determine defined locations 330 of anchor access points 328, such as GPS locations of anchor access points 328. The determined defined locations 330 may be based at least in part on distances between electronic device 110-1 and anchor access points 328, which may be provided by the user, such as via the user interface and/or the human-interface device. In some embodiments, the user may provide heights where anchor access points 328 are located to electronic device 110-1, such as via the user interface and/or the human-interface device.

Electronic device 110-1 may provide information 332 to computer system 130 that specifies anchor access points 328 and defined locations 330. After receiving information 332, interface circuit 310 may provide information 332 to processor 320. Using defined locations 330, processor 320 may compute updated geographic locations (UGL) 334 with reduced uncertainties relative to geographic locations 322. Then, processor 320 may instruct 336 interface circuit 310 to provide updated geographic locations 334 to access points 116.

While FIG. 3 illustrates communication between components using unidirectional or bidirectional communication with lines having single arrows or double arrows, in general the communication in a given operation in this figure may involve unidirectional or bidirectional communication.

Moreover, while FIG. 3 illustrates operations being performed sequentially or at different times, in other embodiments at least some of these operations may, at least in part, be performed concurrently or in parallel.

In some embodiments of the communication techniques, the confidence intervals or uncertainties of a geographic location or an updated geographic location is computed as follows. Obtain the geographic location of a given access point. Alternatively, obtain the defined locations of the anchor access points and estimate the geographic location of the given access point using multidimensional scaling. For the given access point, the 95% confidence interval may be calculated using $$\bar{X} \pm 1.96 \cdot \left(\frac{s}{\sqrt{n}}\right),$$

where $\bar{X}$ is the empirical mean, s is the empirical standard deviation and n is the sample size. For example, if the measured or estimated samples for the latitude of the given access point are: 1, 3, 5, 6, 7, 9 and 12, then n equals 7, $\bar{X}$ equals 6.1428, s equals 3.3987 m and the 95% confidence interval is (3.63, 8.66).

We now describe an example of the calculation of the geographic locations based at least in part on the measured relative distances. Table 1 provides an example of measured relative distances between access points. Note that entries of Infinite corresponding to missing entries in Table 1 (i.e., the relative distance was large enough that a given pair of access points is outside of wireless range of each other.

TABLE 1

|     | AP1 | AP2 | AP3 | AP4 | AP4 |
|-----|-----|-----|-----|-----|-----|
| AP1 | 0 | 12 | 24 | Infinite | Infinite |
| AP2 | 12 | 0 | 16 | 33 | Infinite |
| AP3 | 24 | 16 | 0 | 19 | 40 |
| AP4 | Infinite | 33 | 19 | 0 | 12 |
| AP5 | Infinite | Infinite | 40 | 12 | 0 |

Then, the data in Table 1 (which is sometimes referred to as an 'incomplete distance matrix') may be processed using a shortest path technique to calculate an estimated distance matrix. Note that the shortest path technique may estimate or fill in unknown or missing elements in the incomplete distance matrix (such as elements having values of infinite). In some embodiments, the shortest path technique may include a Dijkstra or a Floyd-Warshall technique. Moreover, the estimated distance matrix may be processed using a multidimensional scaling technique and/or semidefinite programming to calculate the geographic locations of the access points (as well as associated uncertainties).

We now describe embodiments of an electronic device, which may perform at least some of the operations in the communication techniques. FIG. 4 presents a block diagram illustrating an example of an electronic device 400 in accordance with some embodiments, such as one of: base station 108, one of electronic devices 110, controller 112, one of access points 116, one of radio nodes 118, computer network device 128, or computer system 130. This electronic device includes processing subsystem 410, memory subsystem 412, and networking subsystem 414. Processing subsystem 410 includes one or more devices configured to perform computational operations. For example, processing subsystem 410 can include one or more microprocessors, graphics processing units (GPUs), ASICs, microcontrollers, programmable-logic devices, and/or one or more digital signal processors (DSPs).

Memory subsystem 412 includes one or more devices for storing data and/or instructions for processing subsystem 410 and networking subsystem 414. For example, memory subsystem 412 can include DRAM, static random access memory (SRAM), and/or other types of memory. In some embodiments, instructions for processing subsystem 410 in memory subsystem 412 include: one or more program modules or sets of instructions (such as program instructions 422 or operating system 424, such as Linux, UNIX, Windows Server, or another customized and proprietary operating system), which may be executed by processing subsystem 410. Note that the one or more computer programs, program modules or instructions may constitute a computer-program mechanism. Moreover, instructions in the various modules in memory subsystem 412 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 410.

In addition, memory subsystem 412 can include mechanisms for controlling access to the memory. In some embodiments, memory subsystem 412 includes a memory hierarchy that comprises one or more caches coupled to a memory in electronic device 400. In some of these embodiments, one or more of the caches is located in processing subsystem 410.

In some embodiments, memory subsystem 412 is coupled to one or more high-capacity mass-storage devices (not shown). For example, memory subsystem 412 can be coupled to a magnetic or optical drive, a solid-state drive, or another type of mass-storage device. In these embodiments, memory subsystem 412 can be used by electronic device 400 as fast-access storage for often-used data, while the mass-storage device is used to store less frequently used data.

Networking subsystem 414 includes one or more devices configured to couple to and communicate on a wired and/or wireless network (i.e., to perform network operations), including: control logic 416, an interface circuit 418 and one or more antennas 420 (or antenna elements). (While FIG. 4 includes one or more antennas 420, in some embodiments electronic device 400 includes one or more nodes, such as antenna nodes 408, e.g., a metal pad or a connector, which can be coupled to the one or more antennas 420, or nodes 406, which can be coupled to a wired or optical connection or link. Thus, electronic device 400 may or may not include the one or more antennas 420. Note that the one or more nodes 406 and/or antenna nodes 408 may constitute input(s) to and/or output(s) from electronic device 400.) For example, networking subsystem 414 can include a Bluetooth networking system, a cellular networking system (e.g., a 3G/4G/5G network such as UMTS, LTE, etc.), a universal serial bus (USB) networking system, a coaxial interface, a High-Definition Multimedia Interface (HDMI) interface, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 400 may be adapted or changed using pattern shapers (such as directors or reflectors) and/or one or more antennas 420 (or antenna elements), which can be independently and selectively electrically coupled to ground to steer the transmit antenna pattern in different directions. Thus, if one or more antennas 420 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 400 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 414 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 400 may use the mechanisms in networking subsystem 414 for performing simple wireless communication between the electronic devices, e.g., transmitting advertising or beacon frames and/or scanning for advertising frames transmitted by other electronic devices as described previously.

Within electronic device 400, processing subsystem 410, memory subsystem 412, and networking subsystem 414 are coupled together using bus 428. Bus 428 may include an electrical, optical, and/or electro-optical connection that the subsystems can use to communicate commands and data among one another. Although only one bus 428 is shown for clarity, different embodiments can include a different number or configuration of electrical, optical, and/or electro-optical connections among the subsystems.

In some embodiments, electronic device 400 includes a display subsystem 426 for displaying information on a display, which may include a display driver and the display, such as a liquid-crystal display, a multi-touch touchscreen, etc.

Moreover, electronic device 400 may include a user-interface subsystem 430, such as: a mouse, a keyboard, a trackpad, a stylus, a voice-recognition interface, and/or another human-machine interface. In some embodiments, user-interface subsystem 430 may include or may interact with a touch-sensitive display in display subsystem 426.

Electronic device 400 can be (or can be included in) any electronic device with at least one network interface. For example, electronic device 400 can be (or can be included in): a desktop computer, a laptop computer, a subnotebook/netbook, a server, a tablet computer, a cloud-based computing system, a smartphone, a cellular telephone, a smartwatch, a wearable electronic device, a consumer-electronic device, a portable computing device, an access point, a transceiver, a router, a switch, communication equipment, an eNodeB, a controller, test equipment, and/or another electronic device.

Although specific components are used to describe electronic device 400, in alternative embodiments, different components and/or subsystems may be present in electronic device 400. For example, electronic device 400 may include one or more additional processing subsystems, memory subsystems, networking subsystems, and/or display subsystems. Additionally, one or more of the subsystems may not be present in electronic device 400. Moreover, in some embodiments, electronic device 400 may include one or more additional subsystems that are not shown in FIG. 4. Also, although separate subsystems are shown in FIG. 4, in some embodiments some or all of a given subsystem or component can be integrated into one or more of the other subsystems or component(s) in electronic device 400. For example, in some embodiments instructions 422 is included in operating system 424 and/or control logic 416 is included in interface circuit 418.

Moreover, the circuits and components in electronic device 400 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 414 and/or of electronic device 400. The integrated circuit may include hardware and/or software mechanisms that are used for transmitting wireless signals from electronic device 400 and receiving signals at electronic device 400 from other electronic devices. Aside from the mechanisms herein described, radios are generally known in the art and hence are not described in detail. In general, networking subsystem 414 and/or the integrated circuit can include any number of radios. Note that the radios in multiple-radio embodiments function in a similar way to the described single-radio embodiments.

In some embodiments, networking subsystem 414 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape, an optical, a magnetic disk or a solid-state disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the communication techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication techniques may be implemented using program instructions 422, operating system 424 (such as a driver for interface circuit 418) or in firmware in interface circuit 418. Alternatively, or additionally, at least some of the operations in the communication techniques may be implemented in a physical layer, such as hardware in interface circuit 418.

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer system, comprising:
   an interface circuit configured to communicate with access points in an environment and an electronic device, wherein the computer system is configured to:
   provide, addressed to the access points, instructions to measure relative distances between the access points;
   receive, associated with the access points, the measured relative distances;
   calculate geographic locations of the access points based at least in part on the measured relative distances;
   select potential anchor access points in the access points;
   provide, addressed to the electronic device, information specifying the potential anchor access points;
   receive, associated with the electronic device, second information specifying anchor access points in the potential access points and defined locations of the anchor access points, wherein the defined locations of the anchor access points comprise Global Positioning System (GPS) locations;
   update the geographic locations based at least in part on the defined locations of the anchor access points; and
   provide, addressed to the access points, the updated geographic locations.

2. The computer system of claim 1, wherein the environment comprises an indoor environment.

3. The computer system of claim 1, wherein the relative distances are between pairs of access points in the access points.

4. The computer system of claim 1, wherein the measurements are performed using an Institute of Electrical and Electronics Engineers (IEEE) 802.11mc protocol or comprise time-of-flight measurements.

5. The computer system of claim 1, wherein the measurements are performed based at least in part on one or more communication performance metrics.

6. The computer system of claim 1, wherein the potential anchor access points are selected based at least in part on: proximity to a boundary of the environment; being within wireless range of a number of access points; being able to receive cellular-telephone signals and/or GPS signals; uncertainties of the geographic locations; or being an access point in the access points that is unable to receive wireless signals from any other of the access points.

7. The computer system of claim 1, wherein the anchor access points are selected based at least in part on: proximity to a boundary of the environment; being within wireless range of a number of access points; being able to receive cellular-telephone signals and/or GPS signals; and/or include an instance of a GPS integrated circuit.

8. The computer system of claim 1, wherein the updated geographic locations have a reduced uncertainty than the geographic locations.

9. The computer system of claim 1, wherein the computer system comprises: a controller of the access points, which manages, configures, or both, operation of the access points; or a cloud-based computer system.

10. The computer system of claim 1, wherein the defined locations comprise heights where the access points are located.

11. The computer system of claim 1, wherein the calculating of the geographic locations comprises computing a connected graph associated with the access points.

12. The computer system of claim 1, wherein the calculating of the geographic locations is based at least in part on triangulation or trilateration.

13. The computer system of claim 1, wherein, prior to providing the instructions, the computer system is configured to receive configuration information that enables use by the access points of a standard power mode in a band of frequencies in a shared frequency spectrum; and wherein the standard power mode is associated with coordinated use of the band of frequencies by an Automated Frequency Coordination (AFC) system.

14. The computer system of claim 1, wherein communication between the computer system and the access points occurs via a controller, which manages, configures, or both, operation of the access points.

15. The computer system of claim 1, wherein the calculating of the geographic locations comprises: estimating a distance matrix using a shortest path technique, wherein the shortest path technique provides missing elements in the distance matrix; and principal component analysis or multidimensional scaling of the distance matrix.

16. The computer system of claim 1, wherein the updated geographic locations comprise longitudes and latitudes of the access points.

17. The computer system of claim 1, wherein at least some of the access points exclude instances of the GPS integrated circuit.

18. A non-transitory computer-readable storage medium for use in conjunction with a computer system, the computer-readable storage medium storing program instructions that, when executed by the computer system, cause the computer system to perform operations comprising:

providing, addressed to access points in an environment, instructions to measure relative distances between the access points;

receiving, associated with the access points, the measured relative distances;

calculating geographic locations of the access points based at least in part on the measured relative distances;

selecting potential anchor access points in the access points;

providing, addressed to an electronic device, information specifying the potential anchor access points;

receiving, associated with the electronic device, second information specifying anchor access points in the potential access points and defined locations of the anchor access points, wherein the defined locations of the anchor access points comprise Global Positioning System (GPS) locations;

updating the geographic locations based at least in part on the defined locations of the anchor access points; and providing, addressed to the access points, the updated geographic locations.

19. A method for calculating geographic locations of access points, comprising:

by a computer system:

providing, addressed to the access points in an environment, instructions to measure relative distances between the access points;

receiving, associated with the access points, the measured relative distances;

calculating the geographic locations of the access points based at least in part on the measured relative distances;

selecting potential anchor access points in the access points;

providing, addressed to an electronic device, information specifying the potential anchor access points;

receiving, associated with the electronic device, second information specifying anchor access points in the potential access points and defined locations of the anchor access points, wherein the defined locations of the anchor access points comprise Global Positioning System (GPS) locations;

updating the geographic locations based at least in part on the defined locations of the anchor access points; and providing, addressed to the access points, the updated geographic locations.

20. The method of claim 19, wherein the calculating of the geographic locations comprises: estimating a distance matrix using a shortest path technique, wherein the shortest path technique provides missing elements in the distance matrix; and principal component analysis or multidimensional scaling of the distance matrix.

* * * * *